(12) United States Patent
Wulfert et al.

(10) Patent No.: US 7,032,703 B2
(45) Date of Patent: Apr. 25, 2006

(54) OPERATOR CONTROL STATION FOR CONTROLLING DIFFERENT WORK MACHINES

(75) Inventors: Wayne J. Wulfert, East Peoria, IL (US); Sukhwinder S. Guron, Bloomington, IL (US); James I. Portscheller, Sparland, IL (US); Lyle E. York, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 130 days.

(21) Appl. No.: 10/172,945

(22) Filed: Jun. 17, 2002

(65) Prior Publication Data

US 2003/0230447 A1    Dec. 18, 2003

(51) Int. Cl.
    *B60K 26/00* (2006.01)

(52) U.S. Cl. ............ 180/329; 180/89.12; 180/334; 297/344.13

(58) Field of Classification Search ........ 180/326, 180/329, 334, 89.12; 297/330, 344.13, 344.17
See application file for complete search history.

(56) References Cited

U.S. PATENT DOCUMENTS

| | | | |
|---|---|---|---|
| 2,127,323 A | 8/1938 | Breer | |
| 3,195,913 A | 7/1965 | Hallsworth | |
| 3,774,711 A | 11/1973 | Lacey | |
| 3,938,770 A | 2/1976 | Turner et al. | |
| 4,026,379 A * | 5/1977 | Dunn et al. | 180/331 |
| 4,055,230 A | 10/1977 | Kestian et al. | |
| 4,057,122 A | 11/1977 | Brownell et al. | |
| 4,097,085 A * | 6/1978 | Nelson | 296/190.05 |
| 4,200,166 A | 4/1980 | Hansen | |
| 4,278,144 A | 7/1981 | Perin | |
| 4,384,701 A | 5/1983 | Barley | |
| 4,478,308 A | 10/1984 | Klaassen | |
| 4,552,503 A | 11/1985 | Mouri et al. | |
| 4,730,691 A * | 3/1988 | Grigg | 180/329 |
| 4,776,750 A | 10/1988 | Griswold, Jr. et al. | |
| 4,852,660 A | 8/1989 | Leidinger et al. | |
| 4,934,462 A | 6/1990 | Tatara et al. | |
| 5,086,869 A * | 2/1992 | Newbery et al. | 180/329 |
| 5,092,408 A * | 3/1992 | Tatara et al. | 172/2 |
| 5,358,305 A | 10/1994 | Kaneko et al. | |
| 5,406,778 A | 4/1995 | Lamb et al. | |
| 5,529,134 A * | 6/1996 | Yomogita | 180/6.2 |
| 5,536,059 A | 7/1996 | Amirouche | |
| 5,877,414 A | 3/1999 | Rui et al. | |
| 5,924,515 A * | 7/1999 | Stauffer | 180/326 |
| 5,961,179 A | 10/1999 | Dixon et al. | |
| H1831 H | 2/2000 | Kelley et al. | |
| 6,037,675 A | 3/2000 | Yoshinda et al. | |
| 6,039,141 A * | 3/2000 | Denny | 180/329 |
| 6,061,617 A * | 5/2000 | Berger et al. | 701/50 |
| 6,148,946 A | 11/2000 | Takahasi et al. | |
| 6,193,297 B1 | 2/2001 | Vandermolen | |
| 6,446,758 B1 * | 9/2002 | Schatz | 187/222 |
| 6,450,284 B1 * | 9/2002 | Sakyo et al. | 180/329 |
| 6,584,710 B1 * | 7/2003 | Lin et al. | 37/348 |
| 6,663,114 B1 * | 12/2003 | Lamela et al. | 280/6.15 |
| 6,766,600 B1 * | 7/2004 | Ogura et al. | 37/348 |

* cited by examiner

*Primary Examiner*—Paul N. Dickson
*Assistant Examiner*—Toan C. To
(74) *Attorney, Agent, or Firm*—Liell & McNeil

(57) ABSTRACT

In order to enhance an operator's ability to control a work machine, an operator control station includes a seat assembly that is moveably mounted to a body of the work machine. The operator can control, at least in part, primary operator controllable aspects of the work machine by manipulating work machine operating controls attached to move with the seat assembly. The operator can monitor a work machine operating condition, at least in part, via a work machine operating condition display panel also attached to move with the seat assembly. In addition, the operator control station is interchangeable among a plurality of work machines of different types and sizes.

22 Claims, 4 Drawing Sheets

Fig_2_

OPERATOR CONTROL STATION FOR CONTROLLING DIFFERENT WORK MACHINES

TECHNICAL FIELD

The present invention relates generally to operator control stations, and more specifically to an interchangeable operator control station for use in a plurality of different work machines.

BACKGROUND

When designing operator control stations for work machines, engineers have multiple objectives. First, as work machines become more complex, work machine operators increasingly need the ability to vary their viewing perspective to more effectively operate implements of the work machines. For example, a backhoe has a loader on a front end of the machine and an excavator attached to a rear end of the machine. Ideally, the operator should be able to rotate the seat between a position in which he can view the loader and a position in which he can view the excavator. Further, engineers are constantly searching for ways to provide a more comfortable work environment for the operator. The operator may be in a cab of the work machine for long periods of time and may be subjected to vibrations and jarring caused by rough terrain and the operation of the work machine. In addition, the operator should be able to reach work machine operation controls, such as steering wheels, pedals, and levers, and to monitor the work machine operating conditions on a display panel from all seat positions. Engineers are continually seeking strategies to achieve the ideal positioning of the operator without sacrificing the comfort of the operator or machine efficiency.

One strategy for designing an operator control station that achieves these objectives is to attach the work machine operation controls to a rotating operator's seat such that when the operator changes the position of his seat the controls will remain within his reach. For instance, U.S. Pat. No. 4,934,462 to Tatara et al. teaches a backhoe with a rotating seat that includes implement controls joystick) on each arm of the seat. In another example, an operator control station, such as that shown in U.S. Pat. No. 4,730,691 issued to Grigg on Mar. 15, 1988, includes a seat that the operator can rotate 180° in order to operate the work machine in both forward and reverse directions. Hand controls, such as joysticks, are attached to the seat so that the operator can reach the joysticks from any seated position within the cab. Further, a shock absorbing suspension system is included in the seat in order to increase the operator's comfort by insulating the operator from vibrations.

Although some of the work machine operation controls are attached to move with the Grigg operator control station, other controls the operator must manipulate, and displays the operator must monitor during operation of the work machine, are attached to the machine. For instance, foot pedals that control the acceleration and braking of the machine are attached to the body of the work machine. Similarly, the display panel from which the operator can monitor the operating conditions of the work machine also is stationary. Thus, the operator cannot easily monitor all operating conditions while in all seat positions. Besides limiting the operator's ability to control and monitor the work machine from all positions, the stationary controls and panels also limit the engineers ability to enhance the operator's comfort. An active suspension and/or ergonomic strategies that move the operator's seat to compensate for the vibrations caused by the machine or uneven ground are not easily utilized because they may alter the position of the operator with respect to the stationary controls and panel. The stationary controls and panels also limit the space the operator has in the cab. Moreover, work machine operators come in all shapes and sizes. Therefore, a relatively small or relatively large operator may need to adjust the positioning of the seat which may in return affect the operator's view outside the cab and of the display panel within the cab.

In addition, the Grigg operator control station is designed for a specific type of work machine, a Load-Haul Dump vehicle, and thus, is limited in its application. When an operator control station is designed for a specific type or size of work machine, it may include an interface with specific controls that are different than the interfaces of operator control stations designed for other types and sizes of work machines. Thus, the operator may find it difficult to learn and operate different work machines or different sizes of the same type of work machine.

The present invention is directed to overcoming one or more of the problems as set forth above.

SUMMARY OF THE INVENTION

In one aspect of the present invention, an operator control station includes a seat assembly to which an electronic control module and at least one implementation control are attached. The electronic control module is operably coupled to the implementation control.

In another aspect of the present invention, a seat assembly of an operator control station is moveably mounted to a body of a work machine. At least one of a work machine operating condition display panel and work machine operation controls are attached to move with the seat assembly.

In still another aspect of the present invention, there is a method of controlling a work machine. A seat assembly is moveably mounted in the work machine. An operator controls primary operator controllable aspects of the work machine, at least in part, by manipulating work machine operation controls attached to move with the seat assembly. The operator monitors a work machine operating condition, at least in part, via a display panel also attached to move with the seat assembly.

In yet another aspect of the present invention, a plurality of different work machines include interchangeable operator control stations.

In yet another aspect of the present invention, there is a method of installing an interchangeable operator control station, including a seat assembly, in a work machine. Non-specific work machine operation controls and an electronic control module are attached to the seat assembly that is moveably mounted to the work machine. Data specific to the work machine is supplied to the electronic control module.

DETAILED DESCRIPTION

Figure 1:
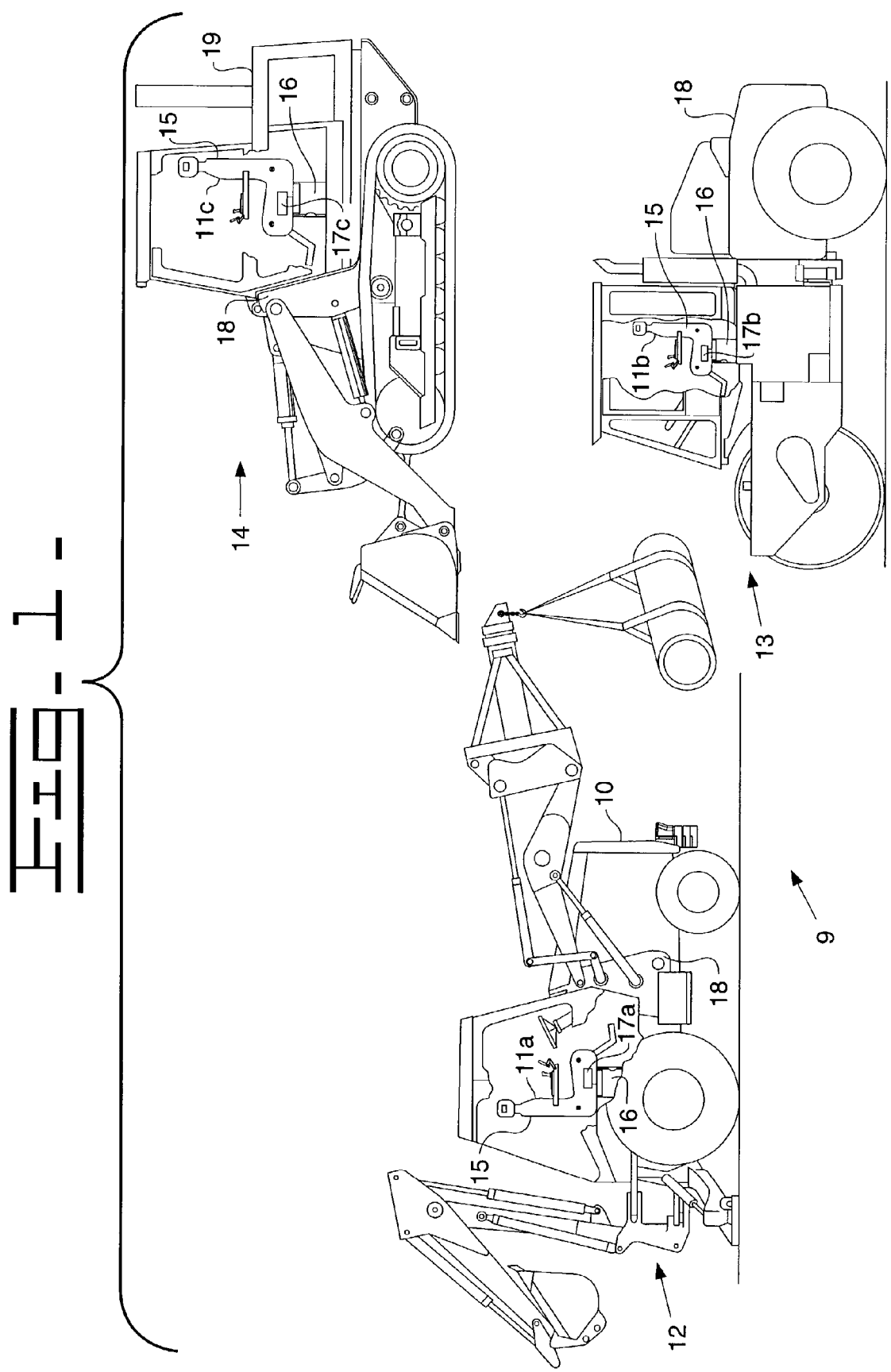
FIG. 1 is a representation of a plurality of different work machines, each including an interchangeable operator control station according to the present invention.

Referring to FIG. 1, there is shown a representation of a plurality of different work machines 9, each including an interchangeable operator control station 11a, 11b, 11c. It should be appreciated that the term "different work machines" is referring to work machines that are dissimilar due to each work machine's type and/or size, and not simply because each work machine is a separate, but identical, machine. The plurality of work machines 9 includes work machines of different types, including, but not limited to a backhoe loader 12, a vibratory drum compactor 13, and a track-type tractor 14. Although the interchangeable operator control stations 11a, 11b, 11c are shown installed in the backhoe loader 12, the vibratory drum compactor 13, and the track-type tractor 14, it should be appreciated that the interchangeable operator control station could be installed in virtually any type or size of work machine, regardless of the implements of the work machine or vehicle. For example, the operator seated in the interchangeable operator control station 11a can control a loader and an excavator, the operator in the operator control station 11b can control a roller, and the operator in the operator control station 11c can control a shovel. Further, the plurality of different work machines 9 also includes work machines of different sizes. Thus, the operator control station is described as interchangeable because it can be installed within different sizes of work machines within product lines and/or even across product lines.

Figure 2:
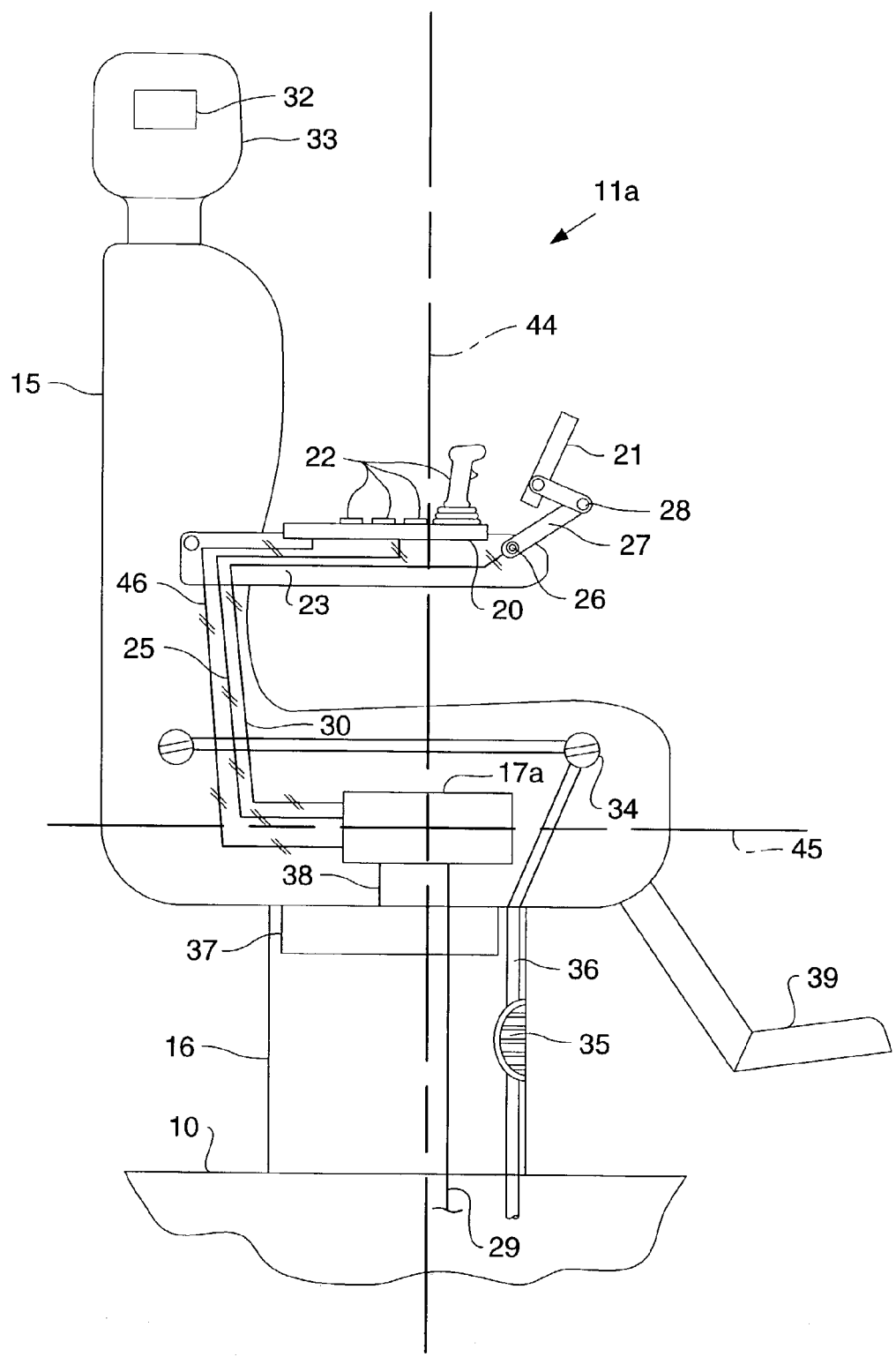
FIG. 2 is a side view of the interchangeable operator control station attached to one of the work machines of FIG. 1 according to a preferred version of the present invention.

It should be appreciated that each interchangeable operator control station 11a, 11b, and 11c is similarly structured, but specialized to the specific types and sizes of work machine 12, 13, 14 to which it is mounted. The operator control stations 11a, 11b, 11c include a seat assembly 15 that is preferably moveably mounted to a body 10, 18, 19 of each work machine 12, 13, 14. It should be appreciated that the seat assembly 15 could be moveably mounted on a base 16 that is attached to the body 10, 18, 19 of the work machine 12, 13, 14, or the seat assembly 15 could be attached to the base 16 that is moveably mounted to the work machine 12, 13, 14. It also should be appreciated that the base 16 can be of any type providing suitable support to the seat assembly 15 and allowing for movement of the seat assembly 15. As shown in FIG. 2, the operator can preferably rotate the seat assembly 15 360° about a vertical axis 44, move the seat assembly 15 along a horizontal axis 45, and adjust the height of the seat assembly 15. However, the present invention includes any seat assembly moveable with respect to the body 10, 18, 19 of the work machine 12, 13, 14, including a seat assembly that rotates less than 360°, or moves along at least one axis. The operator control stations 11a, 11b, 11c preferably include electronic control modules, referred to as the main electronic control modules 17a, 17b, 17c. Although the main electronic control modules 17a, 17b, 17c are preferably embedded in a seat 18 of the seat assembly 15, it should be appreciated that the main electronic control modules 17a, 17b, 17c could be positioned at different locations within the operator control stations 11a, 11b, 11c. Further, the main electronic control modules 17a, 17b, 17c could be positioned within the base 16 or within the body 10, 18, 19 of the work machines 12, 13, 14. Each main electronic control module 17a, 17b, 17c preferably includes programming specific to the type of work machine 12, 13, 14 to which it is attached. However, it should be appreciated that there may be some aspects of the programming that are general to the plurality of work machines 9.

Referring to FIG. 2, there is shown a side view of the interchangeable operator control station 11a attached to the work machine 12 of FIG. 1 according to the preferred version of the present invention. Although the application of the present invention will be described for the backhoe 12, it should be appreciated that the present invention operates similarly in any type or size of work machine within the plurality of work machines 9. It should also be appreciated the interchangeable operator control station 11a may also be referred to as the operator control station 11a. At least one of work machine operation controls 20 and a work machine display panel 21 are attached to move with the seat assembly 15. Although the present invention contemplates an operator control station 11 in which only the display panel 21 or the work machine operation controls 20 are attached to move with the seat assembly 15, the preferred and alternative versions of the invention include both the work machine operating condition display panel 21 and the work machine operation controls 20 being attached to move with the seat assembly 15.

Hand controls 22 that act as the work machine operation controls 20 are preferably attached to arm rest 23 and 24, although they could be attached to the seat assembly 15 at any position within the operator's reach. It should be appreciated that the present invention contemplates work machine operation controls 20 other than hand controls 22, including, but not limited to, foot controls, to move with the seat assembly 15. The work machine operation controls 20 are in communication with the main electronic control module 17a via either an implementation communication line 25 or a driving communication line 46, and the main electronic control module 17a is in communication with at least one electronic control module (shown in FIG. 4) within the body 10 of the work machine 12 via a data link 29. The work machine operating condition display panel 21 is preferably attached to one of the arm rests 23 or 24 of the seat assembly 15, although the work machine operation condition display panel 21 could be attached to the seat assembly 15 at any position within the operator's view. The work machine operating condition display panel 21 is preferably adjustable with respect to the seat assembly 15. The seated operator can move the display panel 21 towards and away from him, upwards or downwards, or even swing the display panel 21 around in order to enter and exit the operator control station 11a. Further, the display panel 21 preferably includes a lock 26 so that the display panel 21 does not move during operation of the work machine 12. Those skilled in the art will appreciate that the work machine operating condition display panel 21 could be moveably attached to one of the arm rests 23 or 24 by any suitable means. For instance, the display panel 21 is illustrated as including an arm 27 that is pivotally attached to the one of the arm rests 23 or 24 of the seat assembly 15, allowing the display panel 21 to move upward and downward. The arm 27 includes a second pivot 28 allowing the display panel 21 to move toward and away from the seated operator. Lastly, the display panel 21 could be moveably attached to its arm 27, such that it could swing out to allow the operator to enter and exit.

Referring still to FIG. 2, there are additional enhancements included within the operator control station 11a. A foot rest 39 is preferably attached to move with the seat assembly 15 and is adjustable with respect to the seat assembly 15. A noise cancellation system 32 is preferably includes speakers positioned within a head rest 33 of the seat assembly 15. Those skilled in the art will appreciate that various noise cancellation systems could be installed at various positions within the operator control station 11a. The illustrated noise cancellation system 32 includes a stereo attached to speakers distributing either cancellation noise and/or entertainment depending on the preference of the operator. Although the speakers are preferably attached to the head rest 33, it should be appreciated that the stereo could be positioned within the head rest 33 or attached to the seat assembly 15 at various positions, such as to one of the arm rests 23 or 24 so that the operator can control the system 32. A climate control 34 system is also preferably included within the operator control station 11a. The climate control system 34 could also be of various types, such as forced air heating and cooling and a seat heating element, or a combination of both. The present invention illustrates the climate control system 34 as including a plurality of forced air heating/cooling vents 35 connected to each other, a heater and an air conditioner via a properly insulated duct 36. The forced air heating/cooling vents 35 are preferably positioned on the seat assembly 15 so that the climate control system 34 surrounds the operator. Further, a seat heating element could also be positioned within the seat 18 and controlled by the operator. In addition, an active suspension system 37 is preferably operably positioned between the work machine body 10 and the seat assembly 15. The active suspension system 37 is preferably in communication with the main electronic control module 17a. The active suspension system 37 is designed to maintain the equilibrium of the operator even when the work machine 12 is operating over rough, uneven, or slanted terrain, such as on the side of a hill. The active suspension will also insulate the operator from the vibrations of the work machine 12. There are different active suspension systems 37 that could be used with the present invention. For example, sensors could be positioned within the seat assembly 15 in order to detect when the seat 18 is out of equilibrium. The sensors would then communicate this information to a motor mechanism assembly via the electronic control module 17a, and the motor mechanism assembly could then level the seat. The same could be accomplished with an electro-hydraulic system. Although the operator may not have complete control over the operation of the automatic active suspension system 37, it is preferred that the operator could partly control the automatic movement of the seat 18 by pre-selecting limitations on the active suspension system 37 into the memory of the electronic control module 17a.

Figure 3:
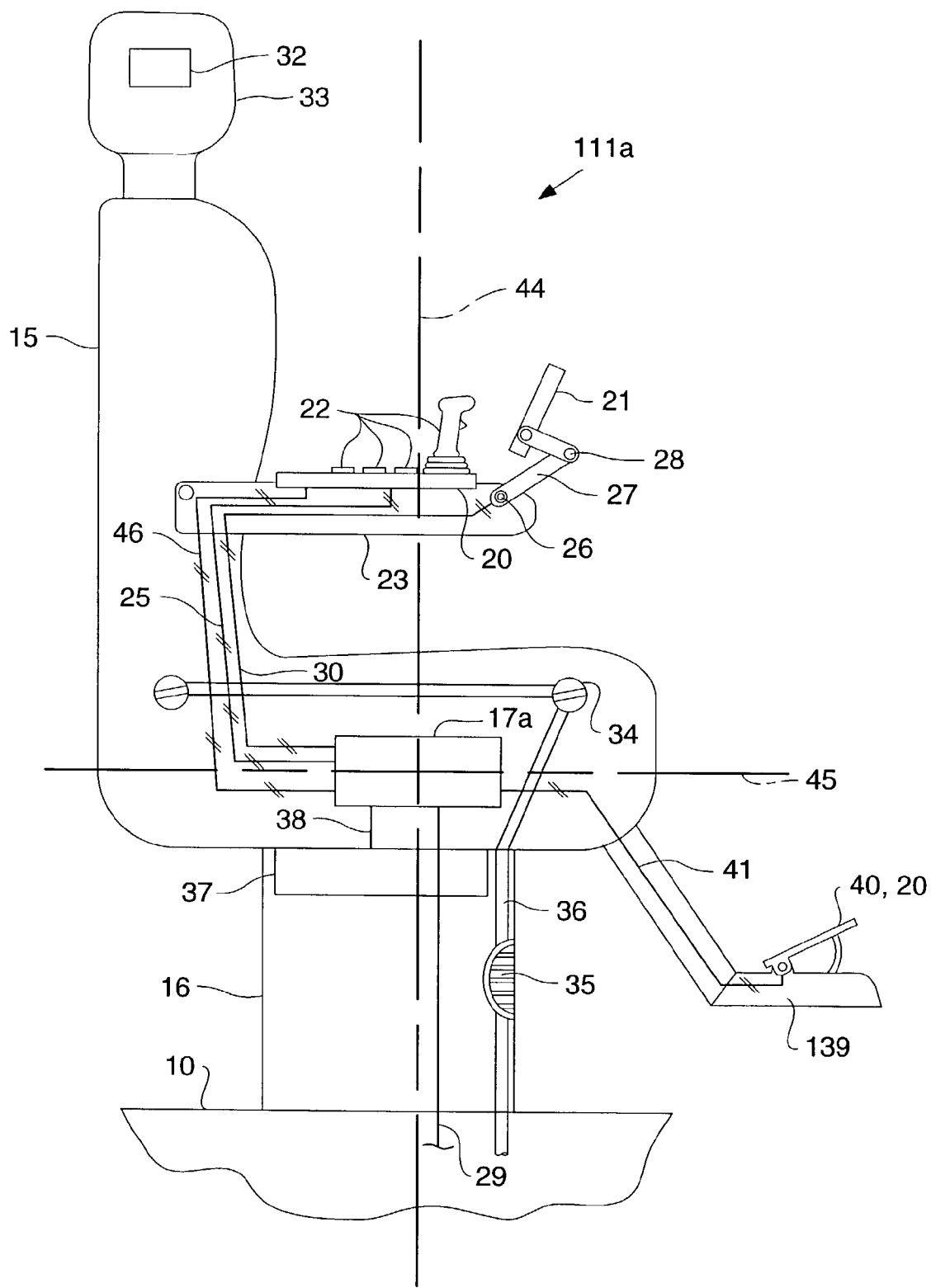
FIG. 3 is a side view of the interchangeable operator control station attached to one of the work machines of FIG. 1 according to an alternative version of the present invention.

Referring to FIG. 3, there is shown a side view of the operator control station 111a of FIG. 1 according to an alternative version of the present invention. Just as with the preferred version of the present invention, the active suspension system 37, the noise cancellation system 32, the climate control system 34, and the work machine operating condition display panel 21 are included within the operator control station 111a. However, in the alternative version, the work machine operation controls 20 include both hand controls 22 and foot controls 40. The foot controls 40 are preferably attached to a foot rest 139 that is attached to move with the seat assembly 15. The foot rest 139, and thus the foot controls 40, are preferably adjustable with respect to the seat assembly 15. The foot controls 40 are preferably pedals that control some aspect of the work machine 12, such as the braking and acceleration of the work machine 12. The foot controls 40 are in communication with the main electronic control module 17a via a foot control communication line 41.

Figure 4:
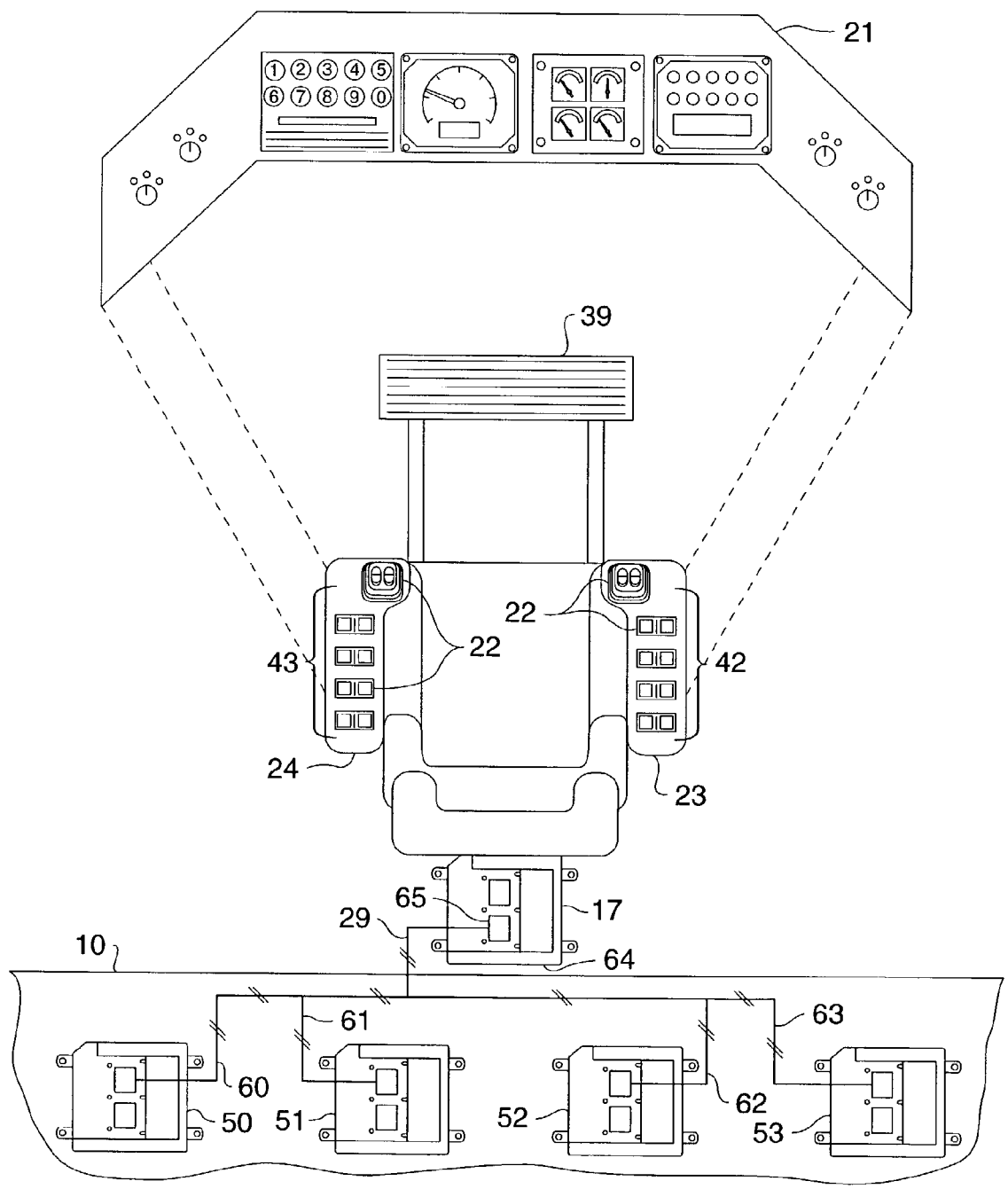
FIG. 4 is a top view of the operator control station attached to one of the work machines of FIG. 1 according to the preferred version of the present invention.

Referring to FIG. 4, there is shown a top view of the operator control station 11a attached to the work machine 12 of FIG. 1 according to preferred version of the present invention. Although the work machine operation controls 20 preferably includes implementation controls 42 and driving controls 43, the present invention includes an operator control station in which there is only one implementation control 42 attached to the seat assembly 15. By manipulating the implementation controls 42, the operator can control, at least in part, the implementations, the backhoe and the loader, of the work machine 12. By manipulating the driving controls 43, the operator can control, at least in part, the movement of the work machine 12 itself. In the preferred version all of the work machine operation controls 20 are preferably hand controls 22. Thus, the implementation controls 42 preferably are attached to the arm rest 23 on a first side of the seat assembly 15, and the driving controls 43 preferably are attached to the arm rest 24 on a second side of the seat assembly 15. In addition, the different controls could have different control capabilities depending on seat position. For instance, when rotated to the excavator side of the backhoe both hand controls could be assigned to control the different aspects of the excavator (bucket, stick, boom, swing). Although for purposes of illustrating the present invention, the implementation controls 42 are attached on the right arm rest 23 and the driving controls 43 are attached to the left arm rest 24, either controls 42 or 43 could be attached on either arm rest 23 or 24. However, it should be appreciated that for uniformity purposes within and across product lines, the placement of the implementation controls 42 and the driving controls 43 preferably remains consistent. Also, it should be appreciated that other types of hand controls, such as seat or temperature controls, could be attached to the arm rests 23, 24. By manipulating the seat controls, the operator could preferably move the seat assembly 15 left, right, forward, backward, and raise or lower the seat assembly 15.

It should be appreciated that the hand controls 22 can be of varying types, sizes, and numbers. For instance, as illustrated, the hand controls 22 include joysticks and switches. However, if the purchaser or operator prefers, the hand controls 22 could include, but are not limited to, mouse-like knobs, buttons, and small steering wheels. Moreover, depending on the number of operator controllable aspects of the specific work machine, the number of hand controls 22 may vary. It should be appreciated that all the desired implementation controls 42 could be included in one modular unit such that after the purchaser chooses the desired type and number of controls 42, the manufacture or dealer could attach the modular unit to the arm rest 24 of the seat assembly 15 already installed in the work machine 12. The same could apply for the driving controls 43.

Referring still to FIG. 4, in the illustrated example, the main electronic control module 17a is in communication with four electronic control modules 50, 51, 52, 53 attached to the body 10 of the work machine 12. An engine electronic control module 50, an implement electronic control module 51, a transmission electronic control module 52, and an auxiliary electronic control module 53 are all in communication with the main electronic control module 17a via an engine communication line 60, an implement communication line 61, a transmission communication line 62 and an auxiliary communication line 63, respectively. The communication lines 60, 61, 62, and 63 are, at least in part, merged into a casing 64 and included within the data link 29. The data link 29 is connected to the main electronic control module 17a via a connector 65, although there could be more than one connector. For instance, each communication line could attach to the main electronic control module 17a via its own connector. There might also be wireless communication. It should be appreciated that each communication line 60, 61, 62, and 63 may be redundantly wired, meaning that there would be two of each communication line in order to protect against failure. It should also be appreciated that although the illustrated example includes four electronic control modules 50, 51, 52, 53 within the body 10 of the work machine 12, there could be any number of electronic control modules, including only a second electronic control module that controls the engine, transmission, implement, auxiliary, etc. In addition, there may be no additional electronic control modules, such that the main electronic control module 17a controls all aspects of the work machine operation.

INDUSTRIAL APPLICABILITY

Referring to FIGS. 1 through 4, there is shown the plurality of work machines 9 including interchangeable operator control stations 11a, 11b, 11c. Although the installation and the operation of the present invention will be described for a backhoe loader 12, it should be appreciated that the installation and operation is similar of the present invention for any type or size of work machine within the plurality of work machines 9. During assembly of the operator control station 11a, the enhancements, such as the noise cancellation system 32, the climate control system 34, and the active suspension 37, will be positioned within the operator control station 11a. The seat 18 will be ergonomically designed to shape to the operator's physique by any one of the methods known in the art. The display panel 21 will be attached to one of the arm rests 23 or 24 via the display panel arm 27 and wired to the main electronic control module 17a embedded in the seat 18 via the display panel communication line 30. Data specific to the work machine for which the operator control station 11a is being assembled, in this instance the backhoe loader 12, is included in the main electronic control module 17a. There are various methods for including the specific data into the main electronic control module 17a that can occur at different stages of assembly and installation. For instance, if the operator control station 11a is already assembled with the main electronic control module 17a embedded in the seat 18, the main electronic control module 17a can be connected to an external computer in order to download the program specific to the work machine 12 into main electronic control module 17a. This process could occur prior to or after installation the operator control station 11a in the work machine 12. In addition, during assembly of the operator control station 11a, a chip programmed with the specific data to the work machine 12 could be inserted into the main electronic control module 17a prior to embedding the main electronic control module 17a in the seat 18. Regardless of the method, there will likely be some aspects of the program general to the plurality of the different work machines 9.

The seat assembly 15 of the interchangeable operator control station 11a is moveably mounted to the body 10 of the work machine 12 by any one of the methods known in the art. The seat assembly 15 can be moveably mounted such that the base 16 rotates with the seat assembly 15 or that the seat assembly 15 rotates about the base 16. The main electronic control module 17a will be connected to the electronic control modules 50, 51, 52, and 53 via the communication lines 60, 61, 62, 63 included within the data link 29 by attaching the connector 65 to the main electronic control module 17a. The casing 64 around the communication lines 60, 61, 62, 63 will be made of a flexible material in order to allow the rotation of the seat assembly 15 about the vertical axis 44. It should be appreciated that the work machine operation controls 20 could be attached to the seat assembly 15 and connected to the main electronic control module 17a prior to or after moveably mounting the operator control station 11a within the work machine 12. However, if the work machine operation controls 20 are attached after moveably mounting the seat assembly 15, the purchaser could choose the work machine operation controls 20 from a display of joysticks, switches, buttons, mini steering wheels, etc. The dealer could then attach the preferred hand controls to the arm rest 23, 24 and connect the controls 20 to either the implementation communication line 25 or the driving communication line 46 via a connector. The purchaser could choose both the desired implementation controls 42 and driving controls 43, when buying the work machine 12.

In preparation for operation of the work machine 12, the operator can determine his ideal position within the cab to control the work machine 12. The operator can adjust the position of the seat assembly 15 by moving the seat assembly 15 upward, downward, left or right. Those skilled in the art appreciate that the movement of the seat assembly 15 along the horizontal 45 or vertical axis 44 can be accomplished by many methods, such as a motor mechanism assembly. Further, the operator can adjust the positioning of the work machine operating condition display panel 21 relative to the seat assembly 15. The operator can swing the display panel 21 outward so he can enter and exit the operator control station 11a. The operator can raise or lower the display panel 21, or push or pull the display panel 21 away from or towards himself. Once the operator determines the ideal position for the display panel 21, he can lock the display panel 21 into position and monitor the work machine operating condition, at least in part, via the display panel 21. The operator may also be able to store these positions of the display panel 21 and the seat assembly 15 in the memory of the electronic control module 17a so that it can be quickly reconfigured for that individual operator. It should be appreciated that the work machine operating condition could include, but is not limited to, the primary aspects of operating condition, such as fuel levels, speed, battery condition, implement status, oil pressure, engine temperature, and may not include all aspects of operating condition, such as secondary work machine operating conditions, including but not limited to lights and door locks.

Once the operator determines the ideal position of himself and the display panel 21, the operator can secure himself into the operator control station 11a and begin to operator the work machine 12. During operation of the work machine 12, the operator's ideal position within the cab may change. For instance, in work machines, such as the backhoe loader 12, there are more than one implements attached to different sides of the work machine 12, and the operator must rotate the operator control station 11a to operate the different implements. Because the display panel 21 is attached to move with the seat assembly 15, the operator will be able to monitor the work machine operating condition while rotating the seat assembly 15. In addition, during the operation of the work machine 12, the operator can control the primary operator controllable aspects of the work machine operation, at least in part, by manipulating the work machine operation controls 20 attached to move with the seat assembly 15. It should be appreciated that the primary operator controllable aspects of work machine operation include, but are not limited to, acceleration, braking, steering, implementation control, and may not include secondary operator controllable aspects, such as lights and locks.

On the first side of the seat assembly 15, preferably attached to the arm rest 23, there will be hand controls 22 acting as the implementation controls 42. The purchaser can choose the type of hand controls 22. By manipulating the implementation controls 42, the operator can control the excavator and the loader. For instance, the operator can operate the excavator by manipulating the joysticks, and then rotate the seat assembly 15, change a switch setting, and manipulate the same joystick in order to control the loader. The same or similar hand controls 22 will be used as implementation controls 42 in the other work machines 13, 14. For instance, joysticks may be positioned on the first side arm rest 24 of the vibratory drum compactor 13 and the track-type tractor 14 to operate their implements, being the roller and the shovel, respectively.

When the operator manipulates the implementation controls 42, such as moves the joystick forward in order to lift the implement, this information will be communicated to the main electronic control module 17a via the implementation communication line 25. The main electronic control module 17a will determine the aspects of the work machine operation that must be altered in order to lift the implement, and communicate this data to the appropriate electronic control modules within the body of the work machine 12. When there is more than one implement, such as with the backhoe loader 12, the implementation electronic control module 51 will control one implementation and the auxiliary electronic control module 53 will control the other implementation. In this instance of the operator wanting to lift the implement, the main electronic control module 17a may not only communicate with the implementation electronic control module 51 to raise the implement, it may also communicate with the engine electronic control module 50 if the operator is driving the machine 12 too quickly or turning the machine 12 too sharply to safely raise the implement. The main electronic control module 17a would communicate to the engine electronic control module 50 via the engine communication line 60 to slow the work machine 12. Thus, by relaying the appropriate information through the main electronic control module 17a before sending it to the appropriate electronic control modules within the work machine 12, the operator control station 11a can help to avoid operator error that leads to safety issues.

On the second side of the seat assembly 15, preferably attached to the second arm rest 24, there are the driving controls 43. Just as with the implementation controls 42, the purchaser can choose the type of the hand control 22 that serve as driving controls 43. As illustrated, the hand control 22 can be a joystick. When the operator moves the joystick left, the operator's order to turn left will be communicated to the main electronic control module 17a via the driving communication line 46. The main electronic control module 17a will then relay the data to turn the work machine 12 left to the engine electronic control module 50. If the electronic control module 17a determines that the operator is driving the work machine 12 too quickly to safely turn the work machine 12 at the desired angle, the main electronic control module 17a may also communicate to the transmission electronic control module 52 to slow the work machine 12. The main electronic control module 17a might compensate for any operator error with the driving controls 43. In addition to the hand control 22 that steers the work machine 12, there must be a hand control 22 that controls the speed of the work machine 12. It should be appreciated that one hand control 22 could control both the direction and the speed of the work machine 12. For instance, in order to accelerate the work machine 12, the hand control 22, such as the preferred joystick, could be moved forward. The farther forward the joystick 22 is moved, the greater the acceleration. In order to slow the work machine 12, the operator could pull back on the joystick 22. The farther back the operator pulls the joystick 22, the slower the work machine 12 will move. However, when the joystick 22 is at top dead center, the work machine 12 is stationary. Once the operator moves the joystick 22 towards himself and past top dead center, the work machine will reverse. In the alternative embodiment illustrated in FIG. 3, the operator controls the acceleration and braking of the work machine 12 by manipulating the foot controls 40, preferably pedals attached to the foot rest 139 to move with the seat assembly 15. However, the operator of the alternative version will still control the direction of the work machine 12 via the hand controls 22 similarly to the operator in the preferred version.

It should be appreciated that similar manipulations of the work machine operation controls 20, regardless of the type of hand controls, could be made to result in similar movements of each type and size of work machine within the plurality of work machines 9. Because the program specific to each work machine 12, 13, 14 preferably includes aspects general to the plurality of different work machines 9, the main electronic control modules 17a, 17b, 17c may process the information sent from the controls 20 similarly. The main electronic control modules 17a, 17b, 17c may be programmed such that moving the driving control 43 on the first arm rest 23 to a predetermined position to the right will cause each work machine 12, 13, 14 to make a similar angled right turn, or moving the driving control 43 from top dead center to a certain position past top dead center may cause each work machine 12, 13, 14 to accelerate to a similar speed. Thus, the driving controls 43 and the implementation controls 42 for each work machine 12 may have a similar look and feel in order to allow the operator to easily transfer his operating skills between work machines 12, 13, 14. It should be appreciated that the correlation between the movement of the work machine and the manipulation of the work machine operation controls 20 may not be identical in machines of varying sizes and limitations.

The present invention is advantageous because the work machine operation controls 20 and the work machine operating condition display panel 21 are attached to move with the seat assembly 15, rather than stationary. Because the controls 20 and the display panel 21 move with the seat assembly 15, the operator can control the primary operator controllable aspects of the work machine operation without sacrificing his ideal position within the cab of the work machine 12, 13, 14. For instance, the operator of the backhoe loader 12 can operate the loader, and then rotate the operator control station 180° in order to operate the excavator without attempting to still reach the stationary pedals or the stationary controls. Further, operators of all sizes can enhance their view outside the cab by adjusting the seat assembly 15 in any direction without concerns about reaching the foot pedals. Even in the alternative version of the present invention, the operator needs not be concerned about reaching the foot pedals because the foot pedals 40 are attached to move with the seat assembly 15 and are adjustable with respect to the seat assembly 15. Also, by attaching the controls 20 and display panel 21 to move with the seat assembly 15, engineers are given increased latitude in designing operator control stations that are comfortable for the operator. Because there is no concern about the operator maintaining the ability to operate the controls 20 or monitor the display panel 21, active suspension systems, such as the active suspension system 37, that maintain the operator's equilibrium and insulate the operator from vibrations of the machine can be used. Also, attaching the controls 20 and the display panel 21 to move with the seat assembly 15 creates more room within the cab of the work machine 12, 13, 14. There is no longer a need for a large dashboard with many displays and/or controls. Thus, operator conveniences, such as a small refrigerator or a second seat, may be placed into the cab.

Moreover, the present invention is advantageous because it includes one electronic control module 17a, 17b, 17c that can process the operator's manipulation of the controls 20 and deliver the data to the appropriate electronic control module 50, 51, 52, and/or 53 within the work machine 12, 13, 14. By utilizing one main electronic control module 17a, 17b, 17c to process information, the operator control station 11a, 11b, 11c can compensate for operator error, thereby reducing safety concerns. The main electronic control module 17a, 17b, 17c will not permit the operator to turn too sharply or lift the implement too quickly, etc.

Also, by utilizing the main electronic control module 17a, 17b, 17c in connection with the non-specific work machine operation controls 20, the operator control station can be interchangeable among a plurality of different types of work machines 9. By simply including information specific to the type of work machine into the electronic control module, the operator control station can be specialized to that particular type of work machine. This can reduce costs of manufacturing multiple types of operator control stations and can lead to increased operator familiarity with the controls of various types of work machines.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. An interchangeable operator control station, comprising:
   a seat assembly with mounting for similar installation in a plurality of dissimilar work machines;
   at least one implementation control attached to the seat assembly;
   an electronic control module attached to the seat assembly and operably coupled to at least one implementation control, and including programming specific to any one of a plurality of dissimilar work machines;
   the electronic control module is operably coupled to at least one driving control attached to the seat assembly; and
   the implementation control is attached to a first side of the seat assembly and the driving control is attached to a second side of the seat assembly.

2. The operator control station of claim 1 wherein at least one of the implementation control and the driving control includes a joystick.

3. The operator control station of claim 2 wherein the seat assembly is moveable;
   at least one implementation control and at least one driving control are attached to move with the seat assembly;
   a work machine operating condition display panel is operably coupled to the electronic control module and attached to move with the seat assembly;
   a foot rest is attached to move with the seat assembly; and
   an active suspension system is attached to the seat assembly.

4. The operator control station of claim 1 wherein the electronic control module is operably coupled to a work machine operating condition display panel attached to the seat assembly.

5. The operator control station of claim 1 wherein the seat assembly is moveable.

6. The operator control station of claim 5 including a foot rest attached to move with the seat assembly.

7. The operator control station of claim 1 including a climate control system attached to the seat assembly.

8. The operator control station of claim 1 including a noise cancellation system attached to the seat assembly.

9. The operator control station of claim 1 including an active suspension system operably coupled to the seat assembly.

10. A work machine comprising:
    an interchangeable operator control station including a seat assembly;
    the seat assembly being moveably mounted to a body of the work machine;
    at least one of a work machine operating condition display panel and work machine operation controls being attached to move with the seat assembly;
    said interchangeable operator station having a similar installation for being interchangeable with an operator station of a dissimilar work machine; and
    a position of the work machine operating condition display panel is adjustable with respect to the seat assembly.

11. A method of controlling a work machine, comprising the steps of:
    mounting an interchangeable operator station that includes a moveable seat assembly in a work machine with an installation that is similar for a plurality of dissimilar work machines;
    programming an electronic control module associated with the interchangeable operator station with data specific to one of a plurality of dissimilar work machines;
    controlling primary operator controllable aspects of work machine operation, at least in part, by manipulating work machine operation controls attached to move with the seat assembly; and
    monitoring a work machine operating condition, at least in part, via a work machine operating condition display panel attached to move with the seat assembly.

12. The method of claim 11 wherein the step of controlling includes a step of controlling implements of the work machine by manipulating implementation controls attached to a first side of the seat assembly, and driving the work machine by manipulating driving controls attached to a second side of the seat assembly.

13. The method of claim 11 including a step of adjusting a position of the operator by rotating the seat assembly around a vertical axis.

14. The method of claim 13 wherein the step of adjusting the position of the operator includes a step of moving the seat assembly along at least one axis.

15. The method of claim 11 wherein the step of monitoring includes a step of adjusting a position of the work machine operating condition display panel relative to the seat assembly.

16. A work machine comprising:
an interchangeable operator control station including a seat assembly;
the seat assembly being moveably mounted to a body of the work machine;
at least one of a work machine operating condition display panel and work machine operation controls being attached to move with the seat assembly;
said interchangeable operator station having a similar installation for being interchangeable with an operator station of a dissimilar work machine;
the work machine operation controls include implementation controls and driving controls; and
the implementation controls including at least one hand control attached to a first side of the seat assembly, and the driving controls including at least one hand controls attached to a second side of the seat assembly.

17. The work machine of claim 16 including an active suspension system operably positioned between the work machine and seat assembly.

18. The work machine of claim 16 wherein the operator control station includes a climate control system attached to the seat assembly.

19. The work machine of claim 16 wherein the operator control station includes a noise cancellation system attached to the seat assembly.

20. The work machine of claim 16 wherein the operator control station includes a foot rest attached to move with the seat assembly.

21. A work machine comprising:
an interchangeable operator control station including a seat assembly;
the seat assembly being moveably mounted to a body of the work machine;
at least one of a work machine operating condition display panel and work machine operation controls being attached to move with the seat assembly;
said interchangeable operator station having a similar installation for being interchangeable with an operator station of a dissimilar work machine;
an electronic control module attached to the seat assembly, and including programming specific to any one of a plurality of dissimilar work machines;
at least one of the work machine operating condition display panel and the work machine operation controls are in communication with the electronic control module;
the electronic control module being a first electronic control module in communication with a second electronic control module attached to the body of the work machine;
a position of the work machine operating condition display panel is adjustable with respect to the seat assembly;
the work machine operation controls include implementation controls attached to a first side of the seat assembly, and driving controls attached to a second side of the seat assembly;
an active suspension system operably positioned between the work machine and the seat assembly; and
a foot rest attached to move with the seat assembly.

22. A group of two or more dissimilar work machines, comprising:
each of the work machines including an interchangeable operator control station;
each said interchangeable operator control station includes identical hardware, but dissimilar programming;
wherein each interchangeable operator control station includes at least one of work machine operation controls and a work machine operating condition display panel being attached to move with the seat assembly;
wherein each interchangeable operator control station includes an electronic control module with the programming;
wherein each electronic control module being a first electronic control module and being in communication with a second electronic control module attached to a body of each of the work machines;
wherein each said first electronic control module includes said programming, which is specific to one of the dissimilar work machines;
the work machine operation controls include implementation controls and driving controls; and
the implementation controls being mounted on a first side of the seat assembly and the driving controls being mounted on a second side of the seat assembly.

* * * * *